United States Patent
Brees et al.

(10) Patent No.: US 8,132,656 B2
(45) Date of Patent: Mar. 13, 2012

(54) RATCHET ONE WAY CLUTCH WITH HARDENED BLOCKING PLATE

(75) Inventors: William Brees, Wooster, OH (US); Adam Uhler, Sterling, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 439 days.

(21) Appl. No.: 12/316,736

(22) Filed: Dec. 16, 2008

(65) Prior Publication Data

US 2009/0159387 A1 Jun. 25, 2009

Related U.S. Application Data

(60) Provisional application No. 61/008,234, filed on Dec. 19, 2007.

(51) Int. Cl.
*F16D 41/18* (2006.01)
*F16D 33/00* (2006.01)
(52) U.S. Cl. ............................. 192/46; 60/345; 60/338
(58) Field of Classification Search ..................... 60/345
See application file for complete search history.

(56) References Cited

U.S. PATENT DOCUMENTS 7,849,990 B2 * 12/2010 Brees et al. ...................... 192/46
2007/0251792 A1 * 11/2007 Brees et al. .................. 192/3.29

OTHER PUBLICATIONS

U.S. Appl. No. 60/796,482, filed May. 1, 2006, Brees et al.
U.S. Appl. No. 11/796,316, filed Apr. 27, 2007, Brees et al.

* cited by examiner

*Primary Examiner* — David D Le
*Assistant Examiner* — Jacob S Scott
(74) *Attorney, Agent, or Firm* — Simpson & Simpson, PLLC

(57) ABSTRACT

A one-way clutch, including: a first annular element; a second annular element arranged to lockingly engage with the first element for relative rotation of the second element, with respect to the first annular element, in a first rotational direction; a third annular element at least partly rotatable about the axis and axially disposed between the first and second elements; and a fourth annular element at least partly rotatable about the axis and including a radially disposed body and an axial protrusion extending from the body and connected to the third element. The axial protrusion forms a portion of a space arranged to at least partially enclose fluid to dampen energy associated with the locking engagement of the first and second annular elements, and the first or second element is axially disposed between the third and fourth elements.

15 Claims, 8 Drawing Sheets

RATCHET ONE WAY CLUTCH WITH HARDENED BLOCKING PLATE

CROSS-REFERENCE TO RELATED APPLICATIONS

This application claims the benefit under 35 U.S.C. §119 (e) of U.S. Provisional Application No. 61/008,234 filed on Dec. 19, 2007 which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a one-way clutch with hydraulic dampening and a hardened steel blocking plate.

BACKGROUND OF THE INVENTION

A one-way clutch with hydraulic dampening is described in commonly assigned and therefore uncitable U.S. patent application Ser. No. 11/796,316, "ONE-WAY CLUTCH WITH DAMPENING" filed Apr. 27, 2007. A blocking plate is disposed between the locking plates of the clutch. The blocking plate is made of unhardened steel to enable the forming of tabs to connect the blocking plate to a fluid blocking plate. Since the blocking plate is unhardened, the forces applied by ramps or other protrusions on the blocking plate during free wheel mode cause wear of the relatively soft blocking plate. Also, the configuration of the blocking plate causes the blocking plate to use extra axial space in the clutch.

Therefore, there has been a longfelt need for a one-way clutch with a more durable blocking plate that required less axial space in the clutch.

BRIEF SUMMARY OF THE INVENTION

The present invention broadly comprises a one-way clutch, including: a first annular element; a second annular element arranged to lockingly engage with the first element for relative rotation of the second element, with respect to the first annular element, in a first rotational direction; a third annular element at least partly rotatable about the axis and axially disposed between the first and second elements; and a fourth annular element at least partly rotatable about the axis and including a radially disposed body and an axial protrusion extending from the body and connected to the third element. The axial protrusion forms a portion of a space arranged to at least partially enclose fluid to dampen energy associated with the locking engagement of the first and second annular elements, and the first or second element is axially disposed between the third and fourth elements.

In a preferred embodiment, the first annular element is rotationally fixed with respect to a longitudinal axis for the clutch, the second annular element is rotatable about the axis, and the first element is axially disposed between the third and fourth elements The axial protrusion extends through an opening in the first or second element, the space is at least partially formed by the body, the third element, and at least one surface of the opening, and, for relative rotation in the first direction, the second element is arranged to engage the third or fourth element and to rotate the axial protrusion in the first direction to at least partially displace the enclosed fluid. The rotation of the second element in the first direction is at least partially retardable due to the at least partially displacing the enclosed fluid.

For relative rotation of the second element, with respect to the first element, in a second rotational direction, opposite the first direction, the second element is engageable with the third or fourth element to rotate the fourth element to at least partially cover the opening. For relative rotation of the second element in the first rotational direction, the second element is engageable with the third or fourth element to rotate the third element to at least partially uncover the opening. In a preferred embodiment, the axial protrusion includes a first portion, bent over the third element and facing the first or second element, to rotationally connect the third and fourth elements, wherein the first or second element includes a protrusion and at least one slot proximate a circumferential end of the protrusion, and wherein during rotation of the second element in the first rotational direction at least one second portion of the axial protrusion is at least partially disposed in the at least one slot. The protrusion extends a first axial distance, the at least one second portion is extendable a second axial distance into the at least one slot, and the first axial distance is greater than the second axial distance.

One of the first or second elements includes a receiving feature, the other of the first or second elements includes a protrusion, and for rotation of the second element in the first rotational direction the protrusion is engageable with the receiving feature to rotationally lock the first and second elements. In a preferred embodiment, the protrusion is arranged to pass through an opening in the third element, or the protrusion includes a ramp and the receiving feature includes an opening. For relative rotation of the second element, with respect to the first element, in a second rotational direction, opposite the first rotational direction, the protrusion is slidingly engageable with the first and third elements.

In a preferred embodiment, the axial protrusion extends through an opening comprising the receiving feature, or the axial protrusion extends through an opening in the one of the first or second elements and the opening is at least partially separate from the receiving feature.

It is a general object of the present invention to provide a one-way clutch with hydraulic dampening of the locking function and improved durability for blocking plates.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

"Front" refers to an axial orientation facing an engine to which a torque converter is connected and "rear" refers to an axial orientation facing a transmission to which the torque converter is connected. It should be understood that the meanings of these terms can be reversed. It also should be understood that a present invention clutch is not limited to the axial orientation shown in the figures. For example, for a same engine and transmission configuration, the orientation can be axially reversed.

Figure 1A:
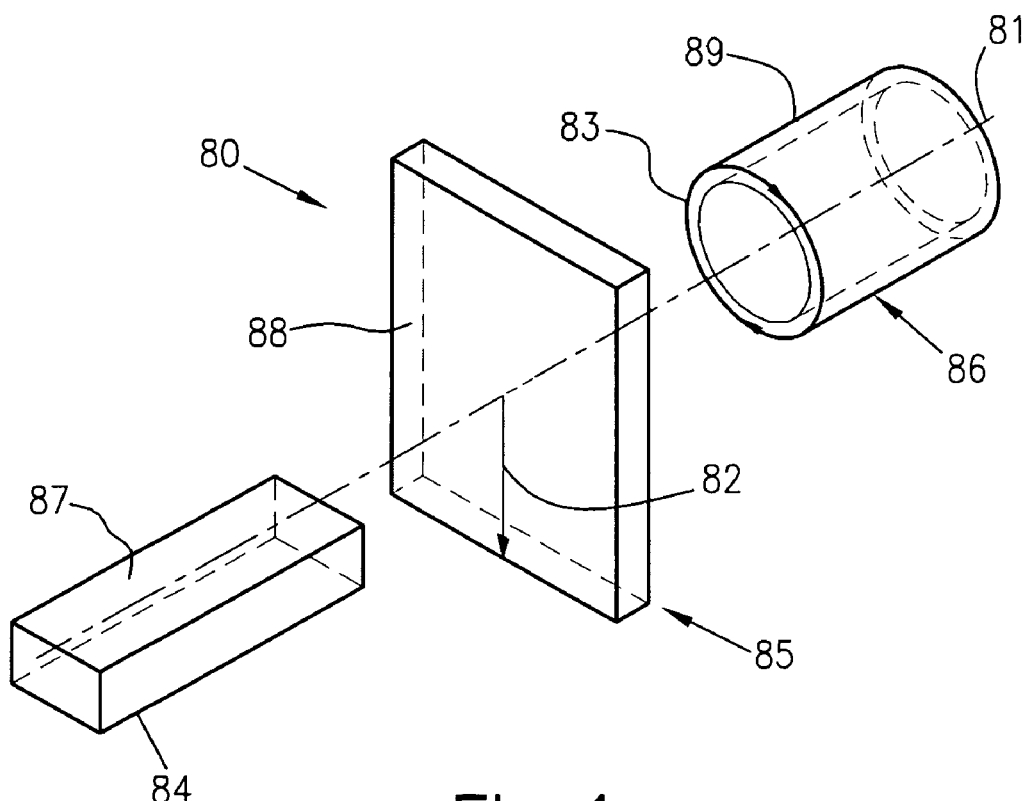
FIG. 1A is a perspective view of a cylindrical coordinate system.

FIG. 1A is a perspective view of cylindrical coordinate system 10 demonstrating spatial terminology used in the present application. The present invention is at least partially described within the context of a cylindrical coordinate system. System 10 has a longitudinal axis 11, used as the reference for the directional and spatial terms that follow. The adjectives "axial," "radial," and "circumferential" are with respect to an orientation parallel to axis 11, radius 12 (which is orthogonal to axis 11), and circumference 13, respectively. The adjectives "axial," "radial" and "circumferential" also are regarding orientation parallel to respective planes. To clarify the disposition of the various planes, objects 14, 15, and 16 are used. Surface 17 of object 14 forms an axial plane. That is, axis 11 forms a line along the surface. Surface 18 of object 15 forms a radial plane. That is, radius 12 forms a line along the surface. Surface 19 of object 16 forms a circumferential plane. That is, circumference 13 forms a line along the surface. As a further example, axial movement or disposition is parallel to axis 11, radial movement or disposition is parallel to radius 12, and circumferential movement or disposition is parallel to circumference 13. Rotation is with respect to axis 11.

The adverbs "axially," "radially," and "circumferentially" are with respect to an orientation parallel to axis 11, radius 12, or circumference 13, respectively. The adverbs "axially," "radially," and "circumferentially" also are regarding orientation parallel to respective planes.

Figure 1B:
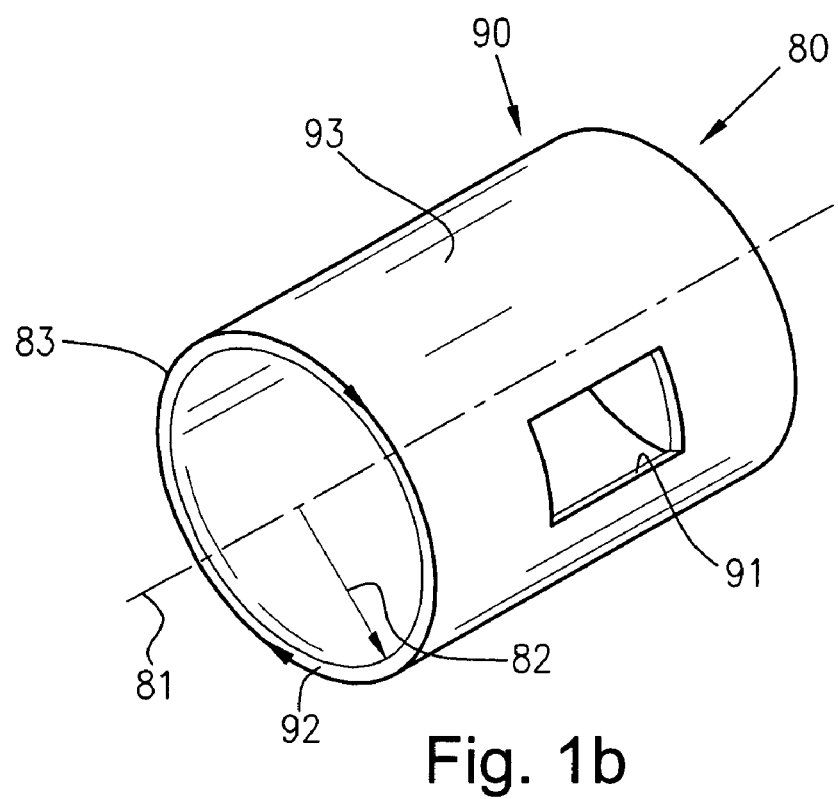
FIG. 1B is a perspective view of an object in the cylindrical coordinate system shown in FIG. 1A.

FIG. 1B is a perspective view of object 20 in cylindrical coordinate system 10 of FIG. 1A demonstrating spatial terminology used in the present application. Cylindrical object 20 is representative of a cylindrical object in a cylindrical coordinate system and is not intended to limit the present invention is any manner. Object 20 includes axial surface 21, radial surface 22, and circumferential surface 23. Surface 21 is part of an axial plane, surface 22 is part of a radial plane, and surface 23 is part of a circumferential plane.

The figures and descriptions that follow are directed to a present invention one-way clutch in a torque converter, however, it should be understood that the figures and descriptions are generally applicable to a present invention one-way clutch in any automotive drive component. The component can be any automotive drive component, including, but not limited to a transmission and an auxiliary drive unit, for example, to power an air conditioner while a drive unit in a vehicle is shut-off. A present invention one-way clutch can be used for any one-way clutch application in a torque converter. In some aspects, the one-way clutch is a stator one-way clutch as described in the figures that follow.

The figures and descriptions that follow are directed to a present invention one-way clutch in a torque converter, however, it should be understood that the figures and descriptions are generally applicable to a present invention one-way clutch in an automotive drive component as described supra. That is, the one-way clutches shown in the figures are in general applicable to an automotive drive component other than a torque converter, for example, a transmission or an auxiliary drive unit. Alternately stated, the hydraulic or mechanical dampening of a one-way clutch and the configuration of one-way clutch components shown in the figures and discussed in the descriptions of the figures are applicable to an automotive drive component other than a torque converter, for example, a transmission or an auxiliary drive unit.

A present invention one-way clutch includes first and second annular elements arranged to lockingly engage for relative rotation of one of the elements with the other, for example, relative rotation of the second element with the first element, in a first rotational direction. Thus both elements can be rotatable, or the first element can be rotationally fixed. In the figures and description that follow, one of the locking annular elements is shown as rotationally fixed; however, it should be understood that both elements can be rotatable.

Figure 2:
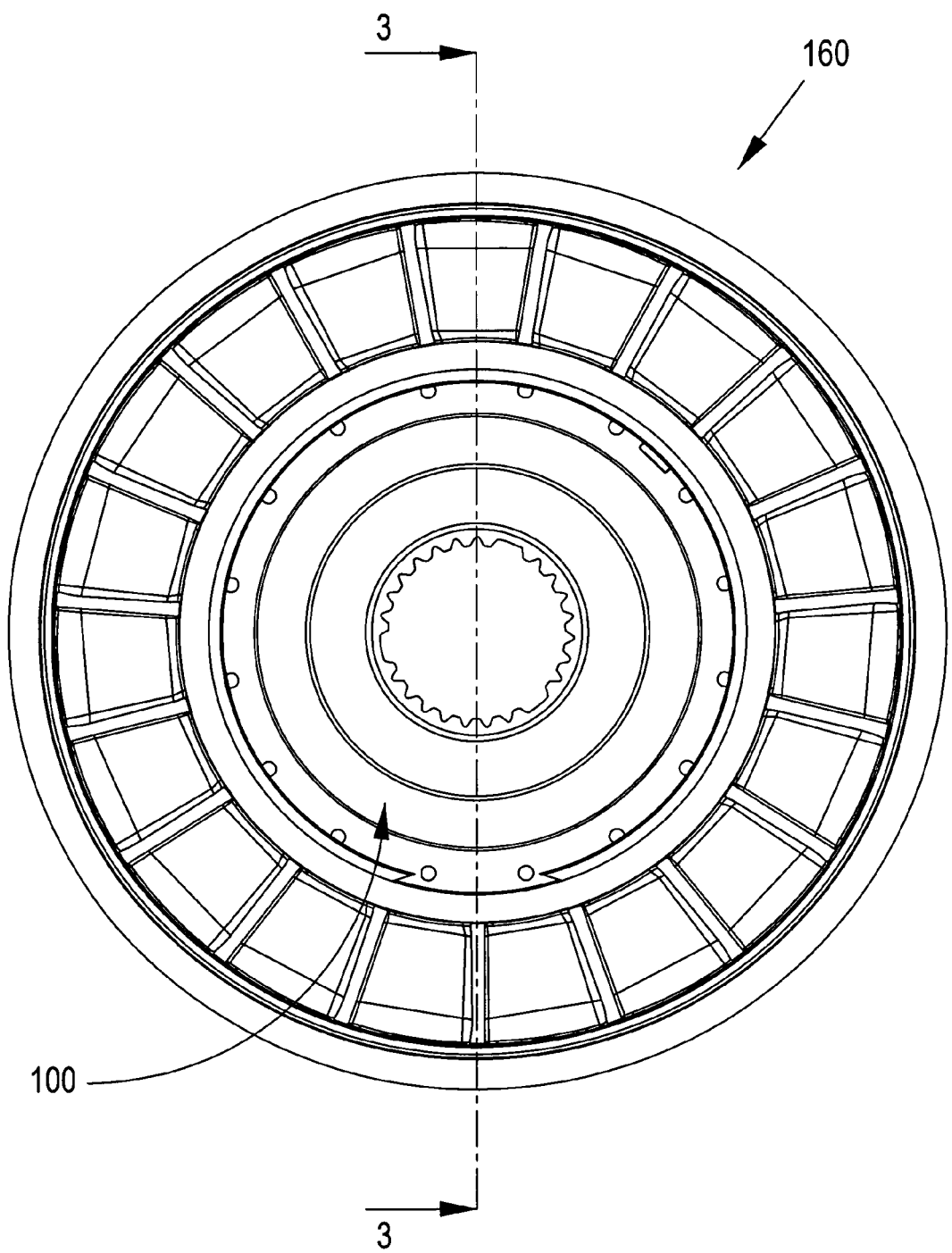
FIG. 2 is a front view of a present invention one-way clutch in a stator.

FIG. 2 is a front view of present invention one-way clutch 100 in a stator.

Figure 3:
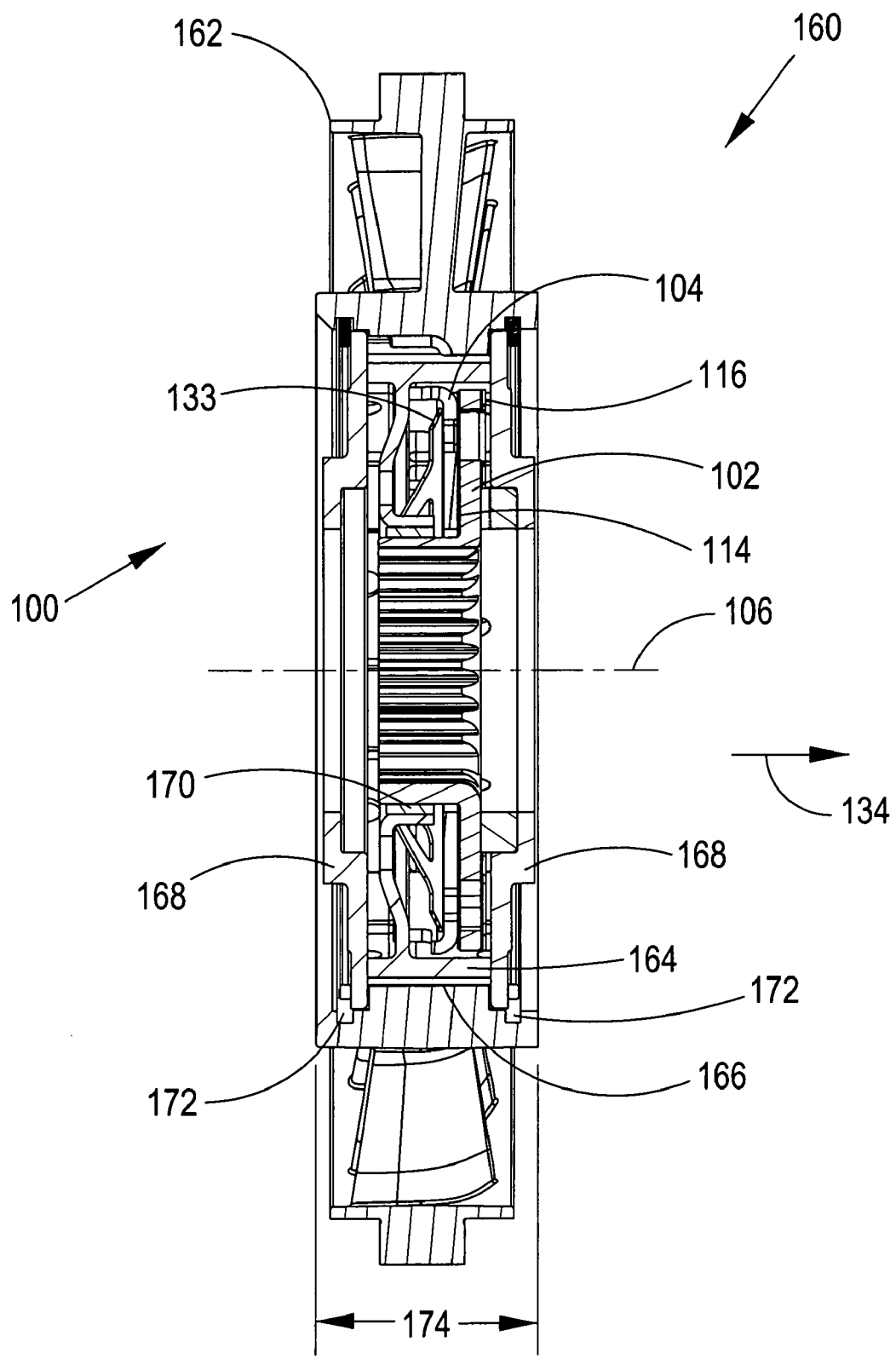
FIG. 3 is a cross-sectional view of the one-way clutch shown in FIG. 2, generally along line 3-3 in FIG. 2.

FIG. 3 is a cross-sectional view of one-way clutch 100 shown in FIG. 2, generally along line 3-3 in FIG. 2.

Figure 4:
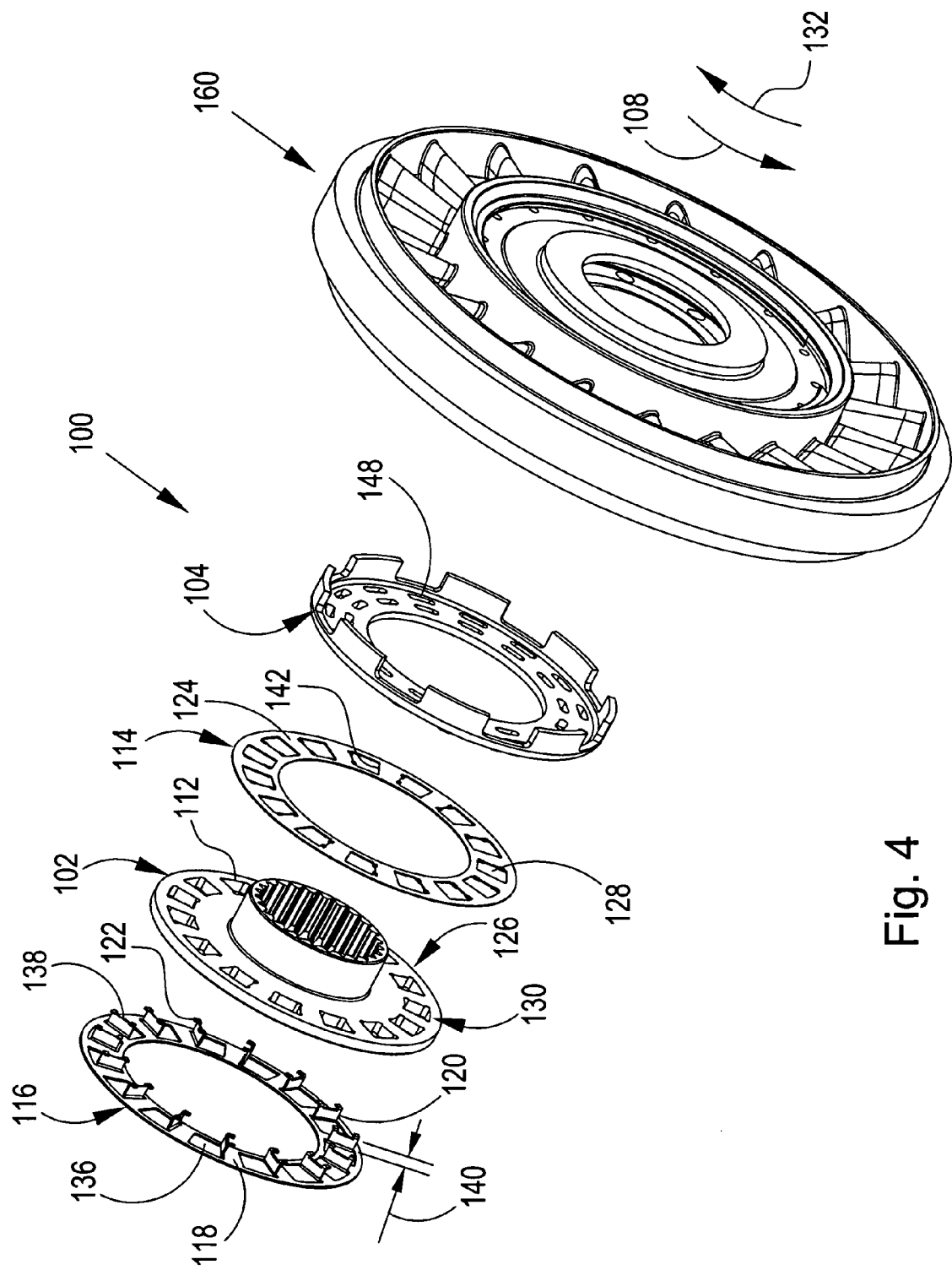
FIG. 4 is a partial exploded rear perspective view of the one-way clutch shown in FIG. 2.

FIG. 4 is a partial exploded rear perspective view of one-way clutch 100 shown in FIG. 2.

Figure 5:
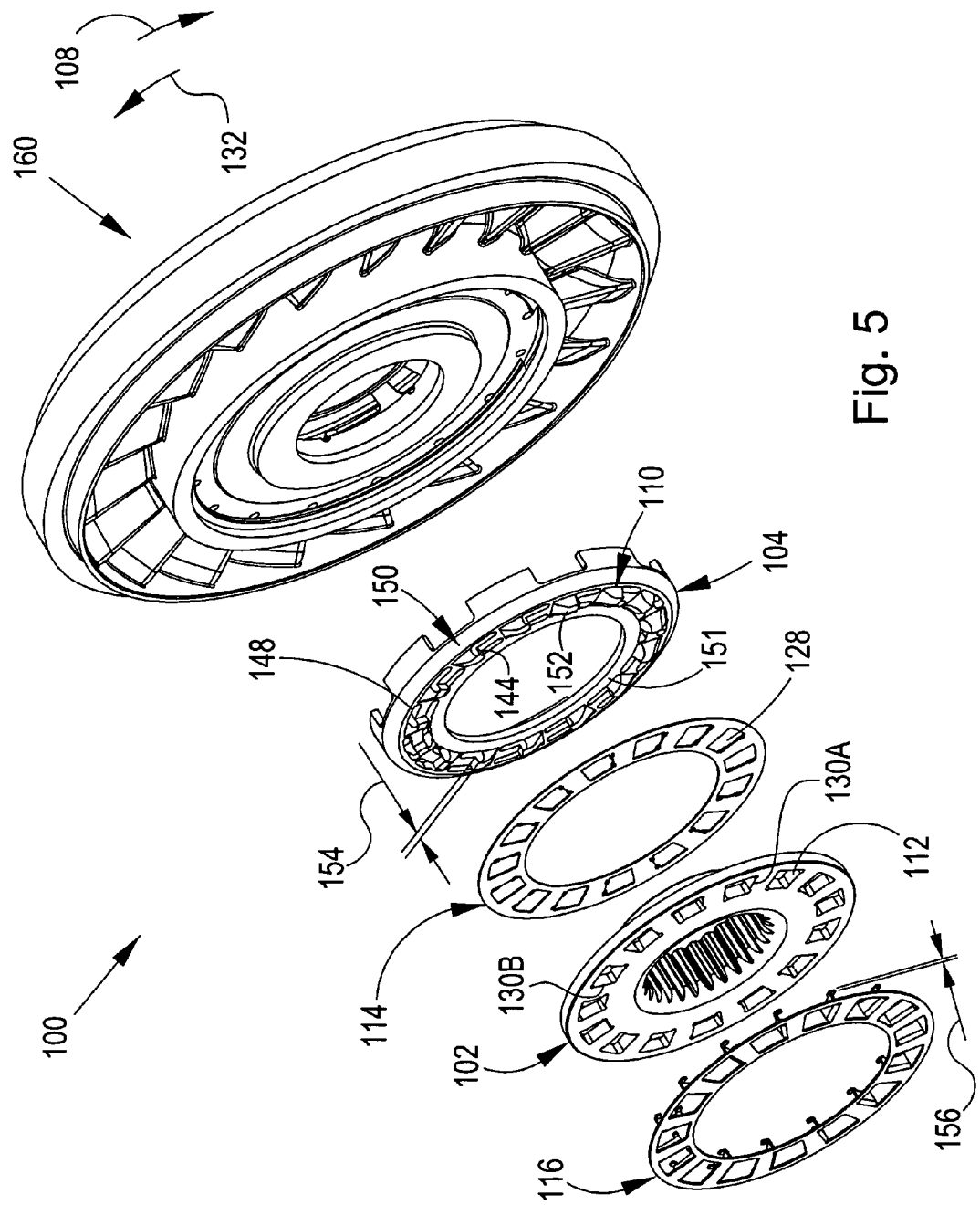
FIG. 5 is a partial exploded front perspective view of the one-way clutch shown in FIG. 2.

FIG. 5 is a partial exploded front perspective view of one-way clutch 100 shown in FIG. 2.

The following should be viewed in light of FIGS. 2 through 5. Clutch 100 includes annular, or radially disposed, elements, or plates, 102 and 104. Plate 102 is rotationally fixed with respect to longitudinal axis 106 for the clutch. That is, the plate does not rotate with respect to axis 106. Plate 104 is rotatable about the axis and is arranged to lockingly engage with plate 102, further described infra, for rotation of plate 104 in rotational direction 108, otherwise known as the locking direction. Although plate 102 is shown as rotationally fixed, it should be understood that the reverse configuration is possible, that is, plate 104 can be fixed and plate 102 can be rotatable.

In a preferred embodiment, plate 104 includes at least one protrusion 110. In one embodiment, the protrusions are ramps. In a preferred embodiment, plate 102 includes at least one receiving feature 112. In one embodiment, the receiving features are openings. It should be understood that clutch 100 is not limited to a particular number of protrusions 110 and features 112 and that the respective numbers of protrusions 110 and features 112 do not necessarily match. The protrusions and features interlock as described infra to lock plates 102 and 104. In the discussion that follows, ramps and openings are used as non-limiting examples.

Clutch 100 also includes annular, or radially disposed, elements, or plates, 114 and 116, each at least partially rotatable about the axis. That is, as further described infra elements 114 and 116 each are capable of at least a limited amount of rotational movement with respect to the axis. Element 114 is axially disposed between elements 102 and 104, and element 102 is axially located between plates 114 and 116. Although plate 102 is shown with receiving features and plate 104 is shown with protrusions, it should be understood that the reverse configuration is possible, that is, plate 104 can include the receiving features and plate 102 can include the protrusions. In this case, plate 116 would be axially 'flipped' so that plates 114 and 116 sandwiched plate 104.

Plate 116 includes radially disposed body 118 and axial protrusion, or tab, 120 extending from the body. Tab 120 connects element 116 to element 114, for example, portion 122 is bent over surface 124 of element 114, so that portion 122 faces plate 104. Tab 120 rotationally connects plates 114 and 116. By rotationally connected, or secured, we mean that the plates are connected such that the plates rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra.

The axial protrusion forms a portion of space 126 arranged to at least partially enclose fluid (not shown) to dampen energy associated with the locking engagement of elements 102 and 104, (further described infra), for example, the engagement of the ramps and openings described supra. The axial protrusion extends through opening 112 in element 102 and opening 128 in element 114. The space is at least partially formed by body 118, tab 120, element 114, and at least one of surfaces 130 of opening 112, for example, the space is contained in openings 112. It should be understood that clutch 100 is not limited to any particular number of openings 112 and 128. Also, it is not necessary for the respective numbers of openings 112 and 128 to be equal.

For rotation in direction 108, plate 104 is arranged to engage plates 114 and/or 116, for example tab 120, to rotate element 116 in direction 108 to at least partially displace the enclosed fluid in space 126. That is, tab 120 is pushed toward surface 130A, reducing the volume of the space and subsequently, displacing fluid in the space. Alternately stated, the rotation of element 104 in direction 108 is at least partially retarded, and the energy associated with the rotation is at least partially dampened, due to the resistance presented by the displacing fluid. For example, energy is required to displace the fluid. This dampening advantageously reduces vibration, and hence, noise, associated with the locking engagement of plates 102 and 104.

For rotation of element 104 in rotational direction 132, opposite direction 108 and otherwise known as the free wheel direction, plate 104 is engageable, for example frictionally engaged, with plates 114 and/or 116 to rotate plate 114 to at least partially cover openings 112. For rotation of element 104 in rotational direction 108, plate 104 is engageable with elements 114 and/or 116 to rotate element 114 to at least partially uncover openings 112. This operation is further described infra.

Clutch 100 also include elastically deformable, or biasing, element 133 which urges plate 104 in axial direction 134, for example, toward plate 102. Element 133 can be any biasing element known in the art, for example, a diaphragm spring. Pushing, or urging plate 104 in direction 134 helps the frictional engagement of plates 104 and 114 and/or 116 noted supra. The operation of plates 102 and 104, biasing element 133, openings 112 and protrusions 110 are described in commonly assigned and therefore uncitable U.S. patent application Ser. No. 11/796,316, "ONE-WAY CLUTCH WITH DAMPENING" filed Apr. 27, 2007 and incorporated by reference herein.

Clutch 100 and the operation of clutch 100 are now described in further detail. In a preferred embodiment, plate 116 is made of unheat-treated, formable steel, to facilitate the bending and forming needed to form tabs 120. Tabs 120 are formed by making openings 136 in plate 116. Plate 114 rests on ends 138 of the tabs, which extend through openings 112. Axial length 140 of the tabs is selected to provide respective predetermined axial clearances between plates 102, 114, and 116 to facilitate rotational movement among the plates. In one embodiment, the respective clearance is approximately 0.2 mm. The tabs extend through openings 128 and are bent over as described supra. In general, holes 112 are axially alignable with holes 136.

In free wheel mode (rotation of plate 104 in direction 132) plate 104 engages and rotates plates 114 and 116 in direction 132 until rotation of plates 114 and 116 is halted by engagement with plate 102, for example, tabs 120 contact sides 130B of openings 112. Body 118 and plate 114 cover openings 112, creating spaces, or cavities, that fill with fluid. As the plate rotates, element 133 pushes plate 104 against plates 114 and 102, and ramps 110 slidingly engage plate 114 and the portions of plate 102 exposed through openings 128. That is, the ramps slide along the plate and exposed portions as the ramps rotate. Thus, the ramps are prevented from entering openings 112. Advantageously, since plate 114 is made of hardened steel, the plate resists deformation as the ramps slide over and push plate 114 against openings 112. Further, plate 114 maintains the resistance to deformation with a smaller axial thickness, advantageously reducing the overall axial length of the clutch. Also, wear on edges 142 of openings 128 is greatly reduced. These attributes address problems noted supra. Also, the robust construction and resistance to deformation of plate 114 enable use of a stronger biasing element, which advantageously enhances the locking operation between plates 102 and 104. Further, since plate 114 is thinner there is less vibration and noise created by the ramps as the ramps slide along the plate and the exposed portions of plate 102 in free wheel mode.

In locking mode (rotation of plate 104 in direction 108) plate 104 engages plate 116 and begins to rotate plates 114 and 116 in direction 108, for example, substantially axial faces 144 of the ramps engage plate 116 and begin to turn plates 114 and 116. As the plates rotate, opening 112 is uncovered and, urged by element 133, the ramps begin to enter the openings. As the ramps continue to enter the openings, the ramps push portion 120 toward side 130A as described supra, squeezing out the trapped fluid and dampening the eventual impact of the ramps with plate 102. Slots 148 are disposed in plate 104 at circumferential end 150 of the ramps. The slots receive bent over portions 122 of the tabs so that the ramps are able to engage the inner plate, that is, the tabs do not engage surface 151 of plate 104 to hold plate 104 off of plate 102.

When plate 104 returns to rotation in the free wheel direction, the ramps slide along sloped surface 152 to lift out of openings 112 and rotate plates 114 and 116 to cover openings 112. To accommodate this initial motion, portions 122 rotate through slots 148. In a preferred embodiment, axial height 154 of the ramps is greater than axial extent 156 of portions 122 so that in free wheel mode, portions 122 do not engage plates 114 or 102. That is, the ramps sufficiently separate surface 151 from portions 122.

In the figures, clutch 100 is shown in stator 160 for a torque converter (not shown); however, it should be understood that clutch 100 is not limited to use with only a stator. Stator 160 includes stator casting 162, driven by fluid (not shown); inner housing 164, which is rotationally connected to the casting, for example, by splines 166; and side plates 168, used to center thrust bearings (not shown) and react the load from the bearings. The stator also includes bushing 170, which centers the inner housing; and snap rings 172, which retain the side plates. However, it should be understood that clutch 100 is not limited to use with the components and configuration shown in the figures and that clutch 100 can be used with stators having other components and configurations.

Figure 6:
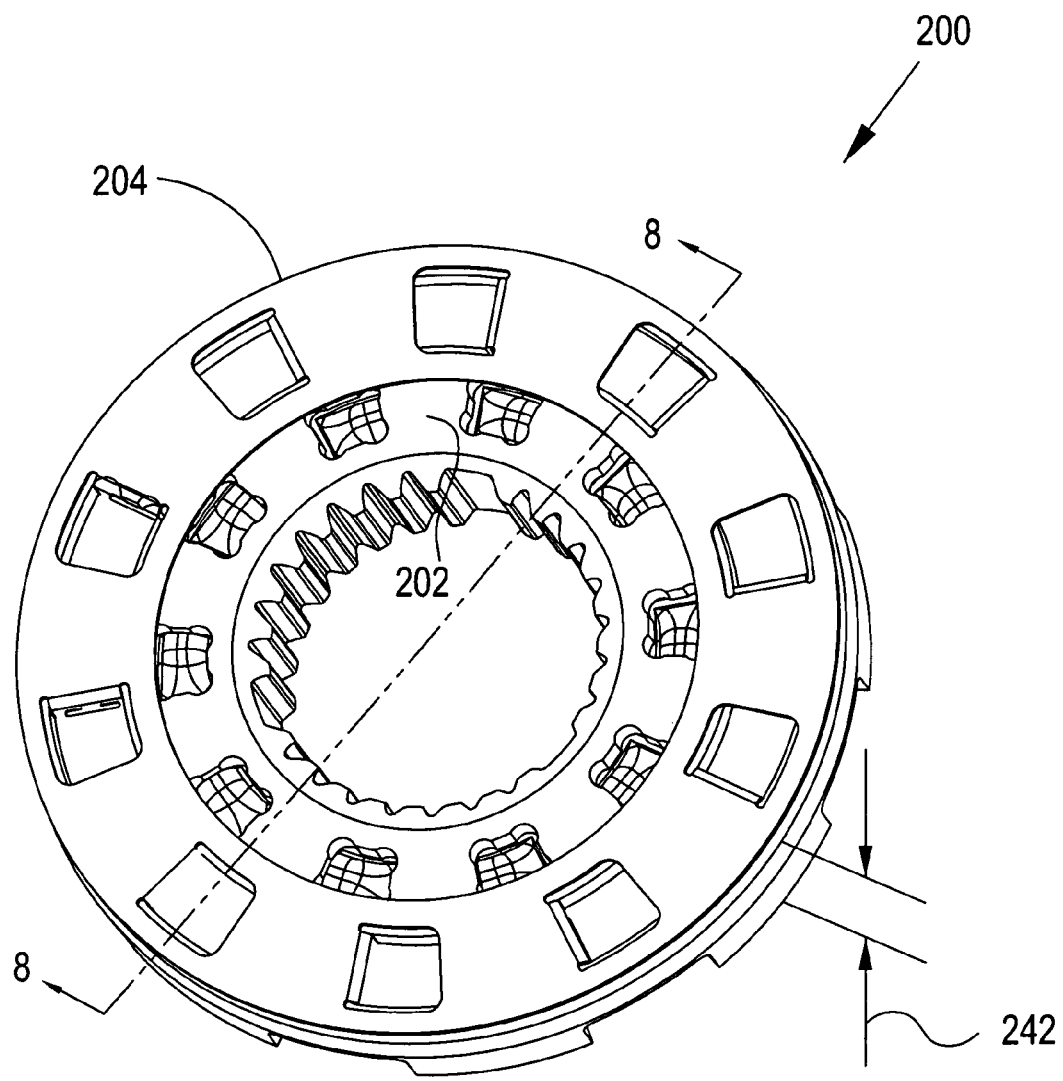
FIG. 6 is a front perspective view of portions of a present invention one-way clutch.

FIG. 6 is a front perspective view of portions of present invention one-way clutch 200.

Figure 7:
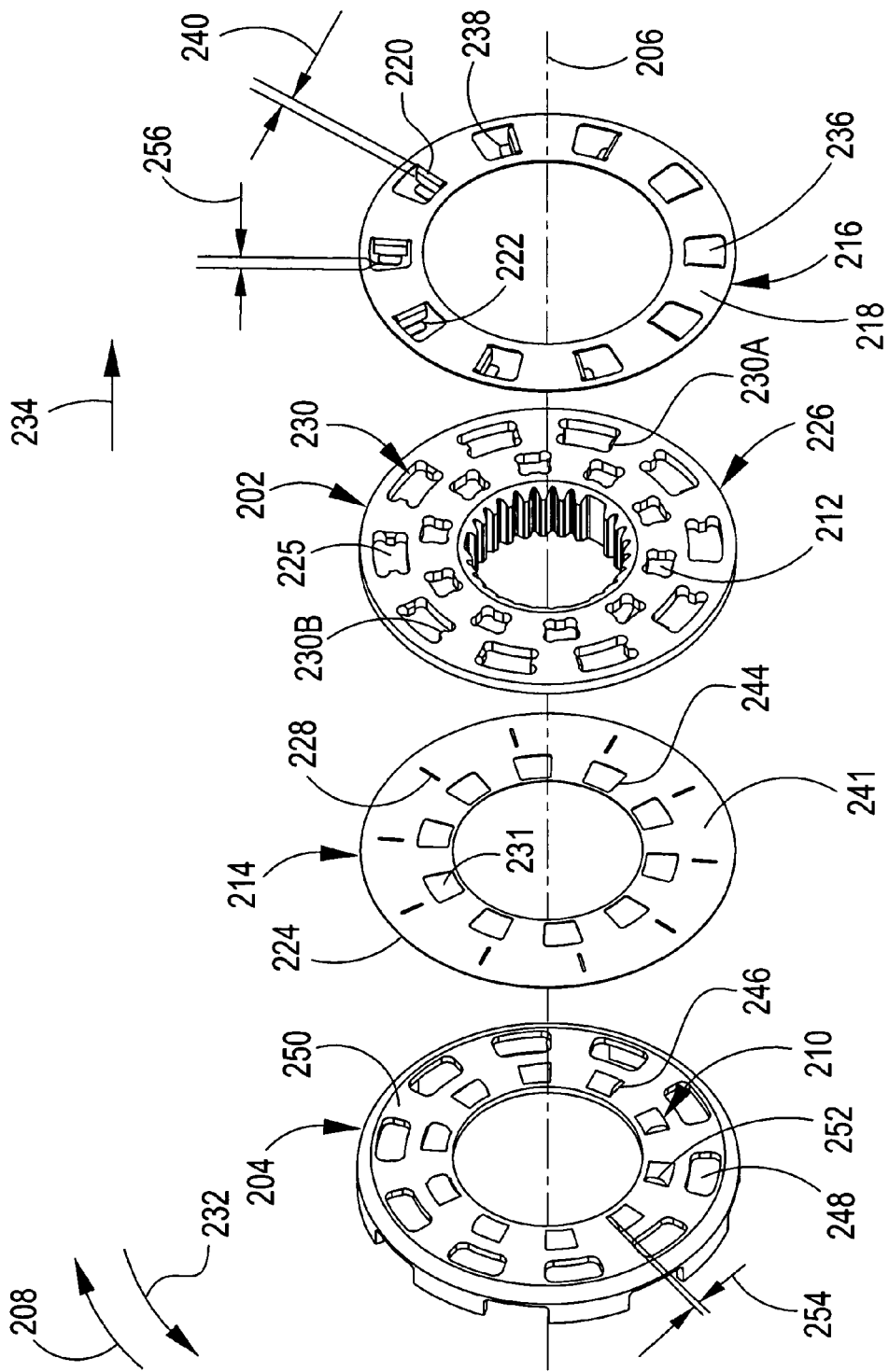
FIG. 7 is an exploded front perspective view of the portions of a one-way clutch shown in FIG. 6; and, FIG. 8 is a cross-sectional view of the one-way clutch shown in FIG. 6, generally along line 8-8 in FIG. 6.

FIG. 7 is an exploded front perspective view of the portions of one-way clutch 200 shown in FIG. 6.

Figure 8:
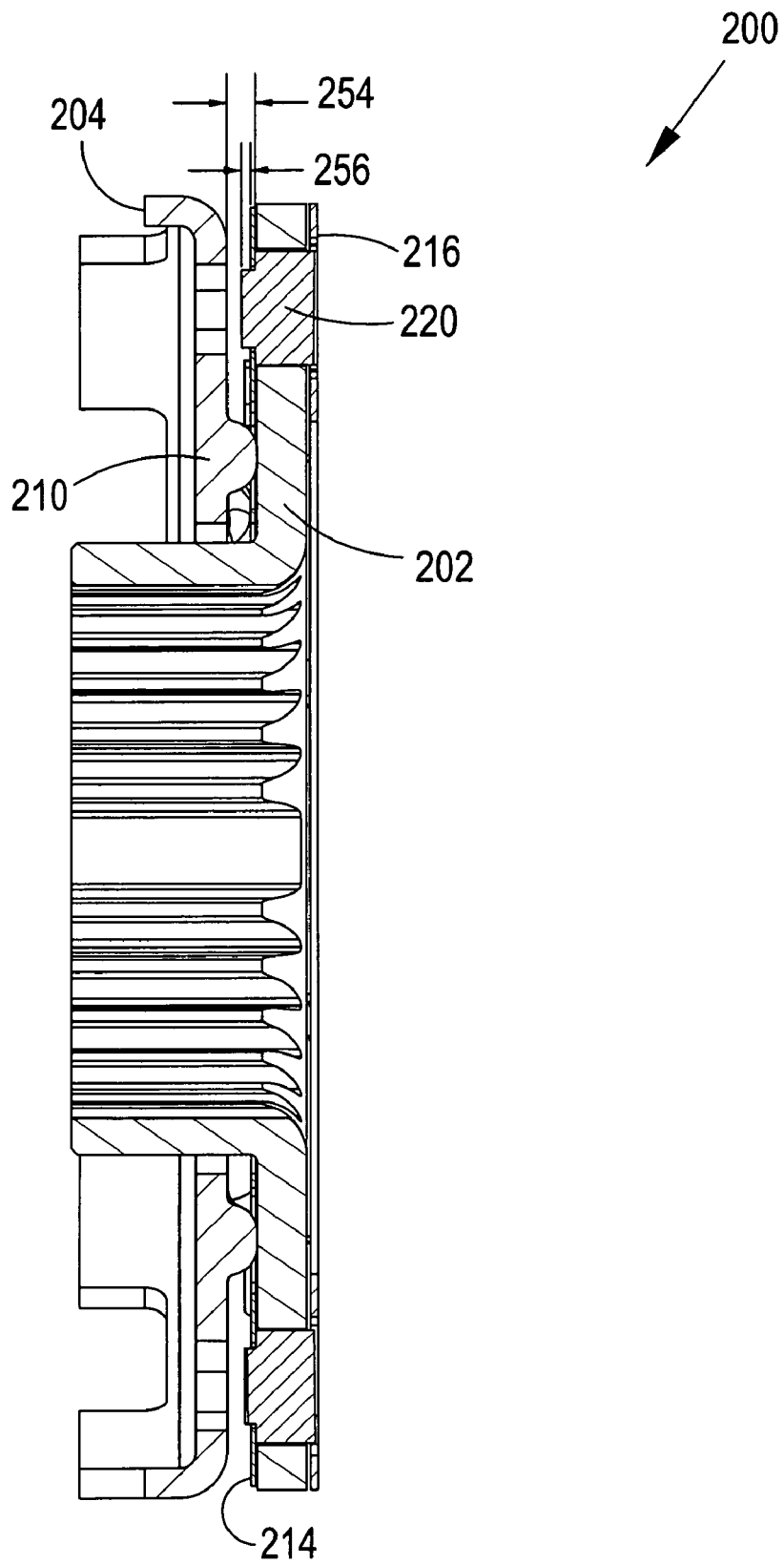

FIG. 8 is a cross-sectional view of one-way clutch 200 shown in FIG. 6, generally along line 8-8 in FIG. 6. The following should be viewed in light of FIGS. 2 through 8. Clutch 200 includes annular, or radially disposed, elements, or plates, 202 and 204. Plate 202 is rotationally fixed with respect to longitudinal axis 206 for the clutch. That is, the plate does not rotate with respect to axis 106. Plate 204 is rotatable about the axis and is arranged to lockingly engage with plate 202, further described infra, for rotation of plate 204 in rotational direction 208, otherwise known as the locking direction. Although plate 202 is shown as rotationally fixed, it should be understood that the reverse configuration is possible, that is, plate 204 can be fixed and plate 202 can be rotatable.

In a preferred embodiment, plate 204 includes at least one protrusion 210. In one embodiment, the protrusions are ramps. In a preferred embodiment, plate 202 includes at least one receiving feature 212. In one embodiment, the receiving features are openings. It should be understood that clutch 200 is not limited to a particular number of protrusions 210 or features 212 and that the respective numbers of protrusions 210 and features 212 do not necessarily match. The protrusions and features interlock as described infra to lock plates 202 and 204. In the discussion that follows, ramps and openings are used as non-limiting examples.

Clutch 200 also includes annular, or radially disposed, elements, or plates, 214 and 216, each at least partially rotatable about the axis. That is, as further described infra elements 214 and 216 each are capable of at least a limited amount of rotational movement with respect to the axis. Element 214 is axially disposed between elements 202 and 204, and element 202 is axially located between plates 214 and 216. Although plate 202 is shown with receiving features and plate 204 is shown with protrusions, it should be understood that the reverse configuration is possible, that is, plate 204 can include the receiving features and plate 202 can include the protrusions. In this case, plate 216 would be axially 'flipped' so that plates 214 and 216 sandwiched plate 204.

Plate 216 includes radially disposed body 218 and axial protrusion, or tab, 220 extending from the body. The tab connects element 216 to element 214, for example, portion 222 is bent over surface 224 of element 214, so that the portion faces plate 204. Tab 220 rotationally connects plates 214 and 216.

Unlike plate 102 in clutch 100, the tab does not extend through the same openings engaged by protrusions 210. Instead, the tabs are located in holes, or openings, 225 in plate 202, at least partially separate from openings 212. In a preferred embodiment, openings 212 and 225 are completely separate. The axial protrusion forms a portion of space 226 arranged to at least partially enclose fluid (not shown) to dampen energy associated with the locking engagement of elements 202 and 204, (further described infra), for example, the engagement of the ramps and openings described supra. The axial protrusion extends through openings 225 in element 202 and openings 228 in element 214. In a preferred embodiment, openings 228 are slots sized to snuggly receive the tabs. The space is at least partially formed by body 218, tab 220, element 214, and at least one of surfaces 230 of opening 225, for example, the space is contained in openings 225. It should be understood that clutch 200 is not limited to any particular number of openings 212 and 225. Also, it is not necessary for the respective numbers of openings 212 and 225 to be equal.

For rotation in direction 208, plate 204 is arranged to engage plates 214 and/or 216, for example tab 220, to rotate element 216 in direction 208 to at least partially displace the enclosed fluid in space 226. That is, tab 220 is pushed toward surface 230A, reducing the volume of the space and subsequently, displacing fluid in the space. Alternately stated, the rotation of element 204 in direction 208 is at least partially retarded, and the energy associated with the rotation is at least partially dampened, due to the resistance presented by the displacing fluid. For example, energy is required to displace the fluid. This dampening advantageously reduces vibration, and hence, noise, associated with the locking engagement of plates 202 and 204.

Plate 214 includes openings, or holes, 231. Holes 231 can be axially aligned with openings 212 as described infra. For rotation of element 204 in rotational direction 232, opposite direction 208 and otherwise known as the free wheel direction, plate 204 is engageable, for example frictionally engaged, with plates 214 and/or 216 to rotate element 214 to at least partially cover openings 212 and 225. For rotation of element 204 in rotational direction 208, plate 204 is engageable with element 214 and/or 216 to rotate element 214 to at least partially uncover openings 212 and 225. This operation is further described infra.

Clutch 200 also include an elastically deformable element (not shown), which urges plate 204 in axial direction 234, for example, toward plate 202. The discussion of element 133 in clutch 100 is applicable to the elastically deformable element for clutch 200. Pushing, or urging plate 204 in direction 234 helps the frictional engagement of plates 204 and 214 and/or 216 noted supra. The operation of plates 202 and 204, the biasing element, openings 212, and protrusions 210 are described in commonly assigned and therefore uncitable U.S. patent application Ser. No. 11/796,316, "ONE-WAY CLUTCH WITH DAMPENING" filed Apr. 27, 2007 and incorporated by reference herein.

Clutch 200 and the operation of clutch 200 are now described in further detail. In a preferred embodiment, plate 216 is made of unheat-treated, formable steel, to facilitate the bending and forming needed to form tabs 220. Tabs 220 are formed by making openings 236 in plate 216. Plate 214 rests on ends 238 of the tabs, which extend through openings 225. Axial length 240 of the tabs is selected to provide respective predetermined axial clearances between plates 202, 214, and 216 to facilitate rotational movement among the plates. In one embodiment, the respective clearance is approximately 0.2 mm. The tabs extend through openings 228 and are bent over as described supra. In general, holes 231 are axially alignable with holes 212 and openings 236 are axially alignable with openings 225.

In free wheel mode (rotation of plate 204 in direction 232) plate 204 engages and rotates plates 214 and 216 in direction 232 until rotation of the plates is halted by engagement with the plate, for example, tabs 220 contact sides 230B of openings 225. Body 218 and plate 214, for example, radially disposed body 241, cover openings 212 and 225. Covering openings 225 creates spaces, or cavities, that fill with fluid. As the plate rotates, the biasing element pushes plate 204 against plates 214 and 202, and ramps 210 slidingly engage plate 214 and the portions of plate 202 exposed through openings 231. That is, the ramps slide along the plate and exposed portions as the ramps rotate. Thus, the ramps are prevented from entering openings 212. Advantageously, since plate 214 is made of hardened steel, the plate resists deformation as the ramps slide over and push plate 214 against openings 212. Further, plate 214 maintains the resistance to deformation with a smaller axial thickness. Also wear on edges 244 of openings 231 is greatly reduced. These attributes address problems noted supra. Also, the robust construction and resistance to deformation of plate 214 enable use of a stronger biasing element, which advantageously enhances the locking operation between plates 202 and 204. Further, since plate 214 is thinner there is less vibration and noise created by the ramps as the ramps slide along the plate and the exposed portions of plate 202 in free wheel mode.

In locking mode (rotation of plate 204 in direction 208) plate 204 engages plates 214 and/or 216 and begins to rotate plates 214 and 216 in direction 208, for example, substantially axial faces 246 of the ramps engage edges 244 of plate 214 and begin to turn plates 214 and 216. As the plates rotate, opening 212 is uncovered and, urged by the biasing element, the ramps begin to enter the openings. As the ramps continue to enter the openings, the ramps push portion 220 toward side 230A as described supra, squeezing out the trapped fluid and dampening the eventual impact of the ramps with plate 202. Openings 248 are disposed in plate 204. The openings receive bent over portions 222 of the tabs so that the ramps are able to engage the inner plate, that is, the tabs do not engage surface 250 of plate 204 to hold plate 204 off of plate 202.

When plate 204 returns to rotation in the free wheel direction, the ramps slide along sloped surface 252 to lift out of openings 212 and rotate plates 214 and 216 to cover openings 212 and 225. To accommodate this initial motion, portions 222 rotate through slots 248. In a preferred embodiment, axial height 254 of the ramps is greater than axial extent 256 of portions 238 so that in free wheel mode, portions 238 do not engage plates 214 or 202. That is, the ramps sufficiently separate surface 250 from portions 238.

Although not shown in the figures, clutch 200 can be used with a stator for a torque converter. In general, the discussion of stator 160 with respect to clutch 100 is applicable to clutch 200.

Plates 102 and 202 and plates 104 and 204 are shown with particular numbers and configurations of receiving features 112 and 212, respectively and protrusions 110 and 210, respectively. However, it should be understood that a present invention one-way clutch is not limited to a particular number or configuration of receiving features or protrusions and that other numbers or configurations of receiving features or protrusions are include in the spirit and scope of the claimed invention. For example, the number and configuration of receiving features and protrusions can be determined according to the torque expected from the torque transmitting element (for example, plates 102 and 104). That is, according to the desired torque capacity of the clutch.

In a preferred embodiment, plates 114, 116, 214, and 216 are formed by stamping.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A one-way clutch, comprising:
   a first annular element;
   a second annular element arranged to lockingly engage with the first element for relative rotation of the second element, with respect to the first annular element, in a first rotational direction;
   a third annular element at least partly rotatable about the axis and axially disposed between the first and second elements; and,
   a fourth annular element at least partly rotatable about a longitudinal axis for the one-way clutch and including a radially disposed body and an axial protrusion extending from the body and connected to the third element, wherein:
   the axial protrusion forms a portion of a space arranged to at least partially enclose fluid to dampen energy associated with the locking engagement of the first and second annular elements;
   the first or second element is axially disposed between the third and fourth elements;
   the axial protrusion includes a first portion, bent over the third element and facing the first or second element, to rotationally connect the third and fourth elements;
   the first or second element includes a protrusion and at least one slot proximate a circumferential end of the protrusion; and,
   during rotation of the second element in the first rotational direction at least one second portion of the axial protrusion is at least partially disposed in the at least one slot.

2. The clutch of claim 1 wherein the first annular element is rotationally fixed with respect to the longitudinal axis, wherein the second annular element is rotatable about the axis, and wherein the first element is axially disposed between the third and fourth elements.

3. The clutch of claim 1 wherein the axial protrusion extends through an opening in the first or second element, wherein the space is at least partially formed by the body, the third element, and at least one surface of the opening, and wherein, for relative rotation in the first direction, the second element is arranged to engage the third or fourth element and to rotate the axial protrusion in the first direction to at least partially displace the enclosed fluid.

4. The clutch of claim 3 wherein the rotation of the second element in the first direction is at least partially retardable due to the at least partially displacing the enclosed fluid.

5. The clutch of claim 3 wherein for relative rotation of the second element, with respect to the first element, in a second rotational direction, opposite the first direction, the second element is engageable with the third or fourth element to rotate the fourth element to at least partially cover the opening.

6. The clutch of claim 3 wherein for relative rotation of the second element in the first rotational direction, the second element is engageable with the third or fourth element to rotate the third element to at least partially uncover the opening.

7. The clutch of claim 1 wherein the protrusion extends a first axial distance, wherein the at least one second portion is extendable a second axial distance into the at least one slot, and wherein the first axial distance is greater than the second axial distance.

8. The clutch of claim 1 wherein one of the first or second elements includes a receiving feature, wherein the other of the first or second elements includes a protrusion, and wherein, for rotation of the second element in the first rotational direction the protrusion is engageable with the receiving feature to rotationally lock the first and second elements.

9. The clutch of claim 8 wherein the protrusion is arranged to pass through an opening in the third element.

10. The clutch of claim 8 wherein the protrusion comprises a ramp and the receiving feature comprises an opening.

11. The clutch of claim 8 wherein, for relative rotation of the second element, with respect to the first element, in a second rotational direction, opposite the first rotational direction, the protrusion is slidingly engageable with the first and third elements.

12. The clutch of claim 8 wherein the axial protrusion extends through an opening comprising the receiving feature.

13. The clutch of claim 8 wherein the axial protrusion extends through an opening in one of the first or second elements and wherein the opening is at least partially separate from the receiving feature.

14. A one-way clutch for a stator, comprising:
a first annular plate rotationally fixed with respect to a longitudinal axis for the stator and having first and second openings at least partially separate from each other;
a second annular plate rotatable about the axis and having a ramp arranged to lockingly engage with the first opening for rotation of the second annular plate in a first rotational direction and to rotate with respect to the first annular plate in a second rotational direction, opposite the first rotational direction;
an annular blocking plate at least partly rotatable about the axis and axially disposed between the first and second annular plates; and,
an annular fluid blocking plate at least partly rotatable about the axis and including a radially disposed body and a tab passing through the second opening and connected to the blocking plate, wherein:
the first annular plate is axially disposed between the blocking plate and the fluid blocking plate;
the fluid blocking plate, the blocking plate, and at least one surface of the second opening form at least a portion of a space arranged to at least partially enclose fluid; and,
for rotation of the second annular plate in the first rotational direction, the second annular plate is arranged to engage the fluid blocking plate to rotate the blocking plate to uncover the second opening and to rotate the tab in the first direction to at least partially displace the enclosed fluid.

15. A one-way clutch for a stator, comprising:
a first annular plate rotationally fixed with respect to a longitudinal axis for the stator and having a first opening;
a second annular plate rotatable about the axis and having a ramp arranged to lockingly engage with the first opening for rotation of the second annular plate in a first rotational direction and to rotate with respect to the first annular plate in a second rotational direction, opposite the first rotational direction;
an annular blocking plate at least partly rotatable about the axis and axially disposed between the first and second annular plates; and,
an annular fluid blocking plate at least partly rotatable about the axis and including a radially disposed body and a tab passing through a second opening in the first annular plate, and connected to the blocking plate, wherein the second opening is at least partially separate from the first opening, wherein the first annular plate is axially disposed between the blocking plate and the fluid blocking plate, wherein the fluid blocking plate, the blocking plate, and at least one surface of the opening form at least a portion of a space arranged to at least partially enclose fluid, and wherein for rotation of the second annular plate in the first rotational direction, the second annular plate is arranged to engage the fluid blocking plate and to rotate the tab in the first direction to at least partially displace the enclosed fluid.

* * * * *